United States Patent
Watkins et al.

(10) Patent No.: US 7,152,193 B2
(45) Date of Patent: Dec. 19, 2006

(54) EMBEDDED SEQUENCE CHECKING

(75) Inventors: Daniel R. Watkins, Saratoga, CA (US); Christopher Cubiss, Campbell, CA (US)

(73) Assignee: LSI Logic Corporation, Milpitas, CA (US)

( * ) Notice: Subject to any disclaimer, the term of this patent is extended or adjusted under 35 U.S.C. 154(b) by 884 days.

(21) Appl. No.: 10/217,601

(22) Filed: Aug. 13, 2002

(65) Prior Publication Data

US 2004/0034823 A1 Feb. 19, 2004

(51) Int. Cl.
*G01R 31/28* (2006.01)

(52) U.S. Cl. ....................................... 714/724
(58) Field of Classification Search ................ 714/724, 714/732, 736
See application file for complete search history.

(56) References Cited

U.S. PATENT DOCUMENTS 4,534,030 A * 8/1985 Paez et al. .................. 714/732

OTHER PUBLICATIONS

MIPS Technologies, "EJTAG Specification", Document No. MD00047, Revision 2.60, Feb. 15, 2001, pp. 1-130.

* cited by examiner

*Primary Examiner*—James C. Kerveros
(74) *Attorney, Agent, or Firm*—Christopher P. Maiorana, P.C.

(57) ABSTRACT

A circuit generally including a control function and a checksum function is disclosed. The control function may be configured to assert (i) a start signal in response to a signal having a predetermined sequence of values matching an entry value and (ii) a stop signal in response to the signal matching an exit value. The checksum function may be configured to (i) generate a checksum value for the signal between assertions of the start signal and the stop signal and (ii) generate a result signal in response to comparing the checksum value with an expected value.

34 Claims, 9 Drawing Sheets

| 132 ↘ | | | | |
|---|---|---|---|---|
| 180 ↘ | 182 ↘ | 184 ↘ | 186 ↘ | 188 ↘ |
| ESC ENABLE | FORCE ENTRY #1 (TO VALIDATE ESC LOGIC) | ON ESC MIS-MATCH, DISABLE CHIP<br><br>A. SOFT RESET FOR BOOT ROM TO TAKE CHIP TO HIGHEST SECURITY LEVEL.<br><br>B. HOLD IN SOFT RESET. | PROGRAM COUNTER DELTA CHECKSUM CALCULATION<br><br>• CHECKSUM SMALLER, LENGTHY RUNS LIKELY TO FIT IN 32 BIT RESULTS.<br>• MULTIPLE ENTRY & EXIT POINT SEQUENCES CAN BE ASSESSED AT THE SAME TIME.<br>• QUICKLY ASSESS IF CHIP LIKELY HAS ISSUE AT LOOP CODE. | HOLD CHECKSUM AT ENTRY POINT + 'N' COUNTS (FOR RMAS) |
| 1 BIT | 1 BIT | 2 BIT | 10 BIT | 10 BIT |

ESC CONTROL REGISTER

EMBEDDED SEQUENCE CHECKING

FIELD OF THE INVENTION

The present invention relates to secure processor tamper detection generally and, more particularly, to an embedded sequence checking method and/or apparatus.

BACKGROUND OF THE INVENTION

Tamper resistant capabilities for security related consumer products commonly create problems for silicon verification for embedded microprocessors. If secure information and internal operations of the embedded microprocessors are accessible from outside the silicon device at the factory for test and validation purposes, the same secure information and internal operations are also accessible in the field thus allowing for tampering. If the secure information and internal operations are made inaccessible in the field, then validation of new devices and validation of parts returned by customers at the factory becomes difficult or impractical.

Figure 1:
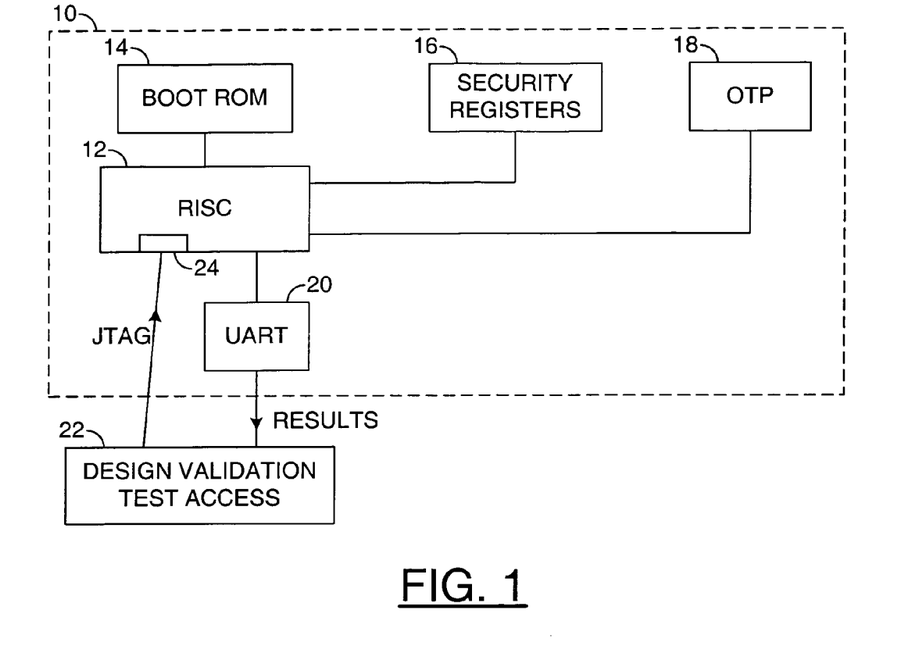
FIG. 1 is a block diagram of a conventional embedded processor system.

Referring to FIG. 1, a block diagram of a conventional embedded processor system 10 is shown. The system 10 generally comprises a processor 12, a boot read-only memory (ROM) 14, one or more secure registers 16, one or more one-time programmable (OTP) memory devices 18, and a communications device 20. The processor 12 is commonly implemented as a reduced instruction set computer (RISC). The communications device 20 is commonly implemented as a universal asynchronous receiver transmitter (UART).

Information stored in the secure registers 16 and the OPT memory devices 18 and other internal operations may be accessed by an external design validation test access 22 through the RISC processor 12. The design validation test access 22 can communicate with the RISC processor 12 through the UART circuit 20 or a test access port 24. An example of a test access port 24 is the Joint Test Action Group (JTAG) test access port. Another conventional method of validation uses a second processor (not shown) to access the secure registers 16 and OTP memory circuits 18 as part of a common memory space. Customers in possession of the circuit 10 can use a variety of tampering techniques to gain access to the contents of the security registers 16 and OTP memory circuits 18 through the JTAG interface or the UART circuit 20.

SUMMARY OF THE INVENTION

The present invention concerns a circuit generally comprising a control function and a checksum function. The control function may be configured to assert (i) a start signal in response to a signal having a predetermined sequence of values matching an entry value and (ii) a stop signal in response to the signal matching an exit value. The checksum function configured to (i) generate a checksum value for the signal between assertions of the start signal and the stop signal and (ii) generate a result signal in response to comparing the checksum value with an expected value.

The objects, features and advantages of the present invention include providing an architecture for embedded sequence checking that may provide for (i) monitoring for proper sequencing, (ii) tools for accessing proper sequencing start and stop points, (iii) a mechanism for accessing embedded processor program counter firmware progress and/or (v) tamper resistant functionality.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Embedded Sequence Checking (ESC) technology may be introduced to do silicon validation on an embedded central processor unit (CPU) with associated functions where there may be limited visibility to secure information and/or internal operations. The ESC generally monitors a limited number of internal signals in a passive and non-intrusive way. The ESC may be different than conventional built-in self test (BIST) capabilities. The ESC may need additional hardware and/or firmware to be present in the silicon. The ESC generally monitors boot read-only memory (ROM) sequencing to confirm that the sequencing may be occurring as expected. The ESC may provide a passive signature with progress information that provides adequate information for assessing operation.

Figure 2:
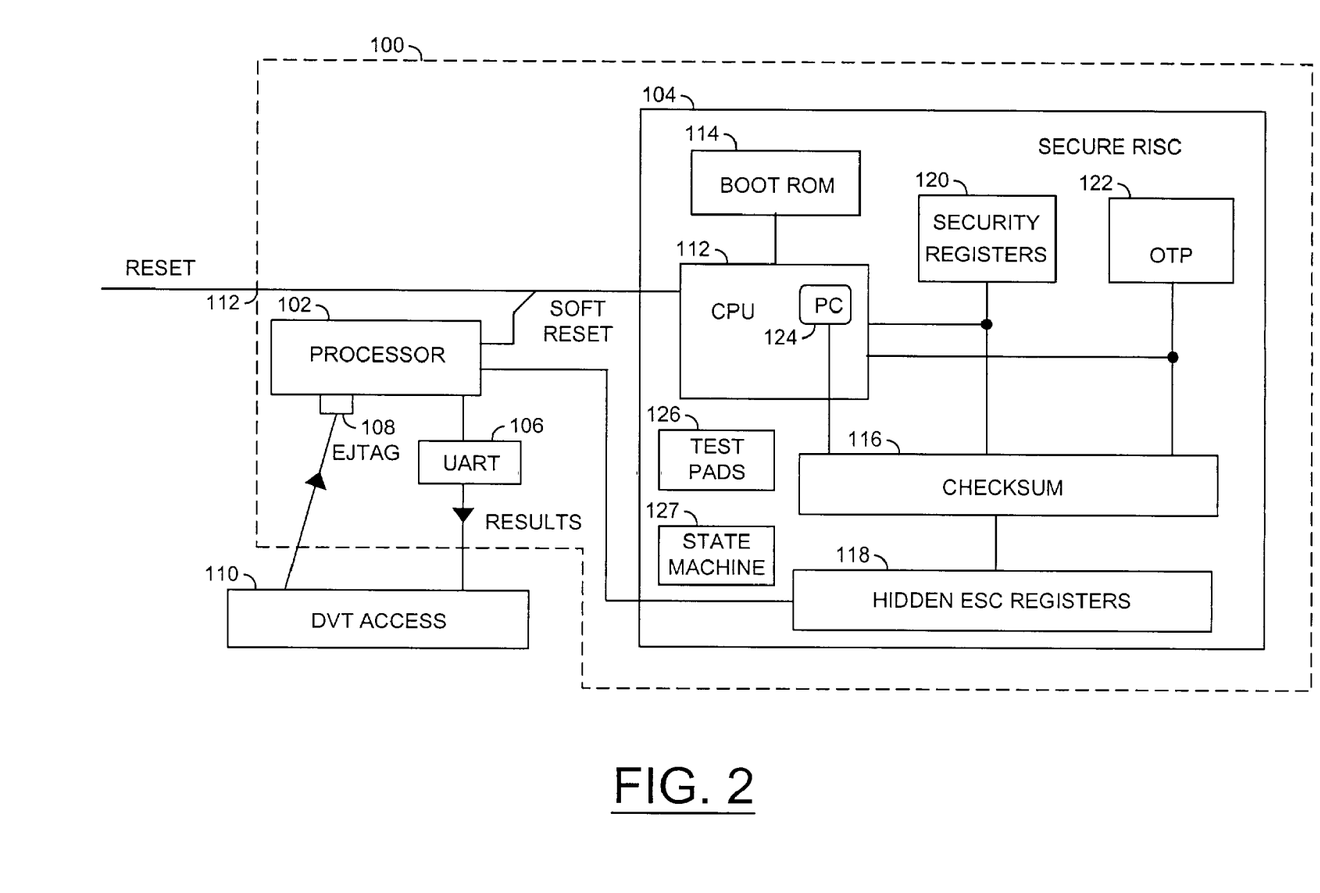
FIG. 2 is a block diagram of an example implementation of a circuit in accordance with a preferred embodiment of the present invention.

Referring to FIG. 2, a block diagram of an example implementation of a device or circuit 100 is shown in accordance with a preferred embodiment of the present invention. The circuit 100 generally comprises a processor circuit (or processor function) 102 and a secure processor circuit (or function 104). A communications circuit (or function) 106 and/or a test access port circuit (or function) 108 may be optionally provided to the circuit 100 to allow for communications between the processor 102 and an external device validation test (DVT) access circuit (or function) 110. The communications circuit 106 may be implemented as a universal asynchronous receiver transmitter (UART) circuit. In one embodiment, each of the circuits/functions within the circuit 100 may be implemented as dedicated or application specific hardware. In another embodiment, each of the circuit/functions within the circuit 100 may be implemented in software. In still other embodiments, a mixture of hardware and software may be used to implement the various functions and circuitry of the circuit 100. The circuit 100 may be implemented as a single chip or integrated circuit.

A signal (e.g., RESET) may be received by the circuit 100 at an interface 112. The signal RESET may be provided the processor circuit 102 and the secure processor 104. Communications between the DVT access circuit 110 and the test access port 108 may be defined by an Extended Joint Test Action Group (EJTAG) Specification, document number MD00047, published by MIPS Technologies, Inc. Mountain View, Calif. and hereby incorporated by reference in its entirety. Communications via the EJTAG test access port 108 may be referred to as a test signal (e.g., EJTAG). Another signal (e.g., RESULTS) may also provide communications between the processor circuit 102 and the DVT access circuit 110 via the UART circuit 106.

The secure processor circuit 104 generally comprises a processor circuit (or processor function) 112, a boot ROM circuit 114 (or function), a circuit (or function) 116 and a circuit (or function) 118. The secure processor circuit 104 may optionally include one or more security registers 120 and/or one or more one-time programmable (OPT) memory circuits (or functions) 122. The processor 112 may include an internal program counter circuit (or function) 124 for addressing the boot ROM circuit 114. One or more test pads 126 may also be provided as a probe-access interface to internal test points and registers. A state machine 127 may also be included in support of a built-in self test capability.

The processor 112 may be implemented as a secure processor embedded within said circuit 100. The secure processor may be implemented as a reduced instruction set computer (RISC), a complex instruction set computer (CISC), a pipelined processor, or the like. The secure processor 112 may have limited or no direct communications with circuitry external to the circuit 100, other than through the test pads 126.

The circuit 116 may be implemented as a checksum circuit. The checksum circuit 116 may compare an address signal generated by the program counter circuit 124 against predetermined start points and stop points. Once the checksum circuit 116 detects a match between the address signal and a starting point, the checksum circuit 116 may calculate a checksum value from the address signal. Calculation of the checksum value may continue until a match may be detected between the address value and a stop point.

The circuit 118 may be implemented as a hidden ESC register circuit. The hidden ESC register circuit 118 generally comprises multiple registers that store a final checksum result, intermediate checksum values, and/or user determined parameters associated with the sequence checking. The hidden ESC registers 118 may be accessible for read and/or write by the processor circuit 102. The processor circuit 102 may therefore read the final checksum result from the hidden ESC register circuit 118 then present the final checksum result to the DVT access circuit 110 in the signal RESULTS and/or via the signal EJTAG.

The security registers 120 may have limited access from outside the secure processor circuit 104. For example, the security register 120 may be configured as write-only for circuitry external to the secure processor circuit 104. However, the secure processor 112 may have access to read stored register values and write new register values to the security registers 120.

The OTP memory circuits 122 may be implemented as programmable fuses, antifuse, and/or other nonvolatile memory devices. The OTP memory circuits 122 may have limited access from outside the secure processor circuit 104. For example, the OTP memory circuits 122 may be configured as write-only for circuitry external to the secure processor circuit 104. The secure processor 112 may have read access and write-once access to the OTP memory circuits 122. The OTP memory circuits 122 may be used for storing programmed values such as security keys and other variables.

The test pads 126 may be configured for test probing but not production wire bonding. The test pads 126 may provide an interface allowing access to internal operations of the secure processor circuit 104, the security registers 120, the OTP memory circuits 122, the checksum circuit 116 and/or the hidden ESC register circuit 118. Information accessed through the test pads 126 may be limited. For example, the contents of the security registers 120 may be readable through the test pads 126 for validation but not writable to avoid tampering. Likewise, the OTP memory circuits 122 may be readable through the test pads 126 for validation but not writable.

Operationally, the processor circuit 102 may be used to communication information generated external to the circuit 100 to the secure processor 112, the security registers 120, the OTP memory circuits 122 and/or the hidden ESC register circuit 118. The information may be used to configure and validate the operations and secure data of the secure processor circuit 104. The processor 102 may also have access to the hidden ESC register circuit 118 to obtain the final checksum result of the checksum operation performed by the checksum circuit 116. The final checksum result may then be passed to the DVT access circuit 110 to validate configuration and operation of the secure processor circuit 104. Since the processor 102 may be restricted to reading only the final checksum result value from the secure processor circuit 104, then information regarding the actual internal operations of the secure processor 112, contents of the security registers 120 and/or programmed values in the OTP memory circuits 122 may remain hidden within the secure processor circuit 104 thus making tampering much more difficult.

Generation of the final checksum result generally involves monitoring the program counter 124 during a window of operation such that a checksum can be calculated. The checksum may be a sum of all the program counter values in the window of operation. Monitoring sequences of program counter values may catch most to all invalid sequences. The checksum may be compared with an expected value. If the actual checksum does not match the expected value, the circuit 100 may be diagnosed (e.g., with a chip returned from a customer) or disabled (e.g., when checking for glitching). Because the specific program counter sequence may be monitored and strict adherence to the sequence occurs or an error is generally detected and reported, even microprobing, eavesdropping, and fault generation tamper techniques may be unlikely to succeed. Examples of entry points in the boot ROM addresses to perform checksum include, but are not limited to reset, flash memory (not shown) update, flash memory authentication, read key protection, write key protection, EJTAG disable, and EJTAG authentication. Examples of exit points may include, but are not limited to cleanup and reset to security disabled.

In one embodiment, the sequence checked may be for a signal other than the program counter. For example, a short clock cycle may be used to move the program counter value without execution of an associated instruction. Therefore, a checksum of the program counter values may produce the expected results and miss the glitch caused by the short clock cycle. By performing an embedded sequence check on the actual instructions executed, the sequence of instructions may be incorrect due to the glitch. A checksum of the instructions may not produce the expected results and thereby detect the glitch.

The hidden ESC register circuit 118 may be hidden from normal software applications executed by the processor 102. Access to the hidden ESC register circuit 118 may be made by way of register/memory writes and reads that may form a unique combination of addresses, data on the bus, register indexing and/or last access criteria of the processor 102. Therefore, accidental access to the hidden ESC register circuit 118 be made impractical during normal operation of the circuit 100.

Figure 3:
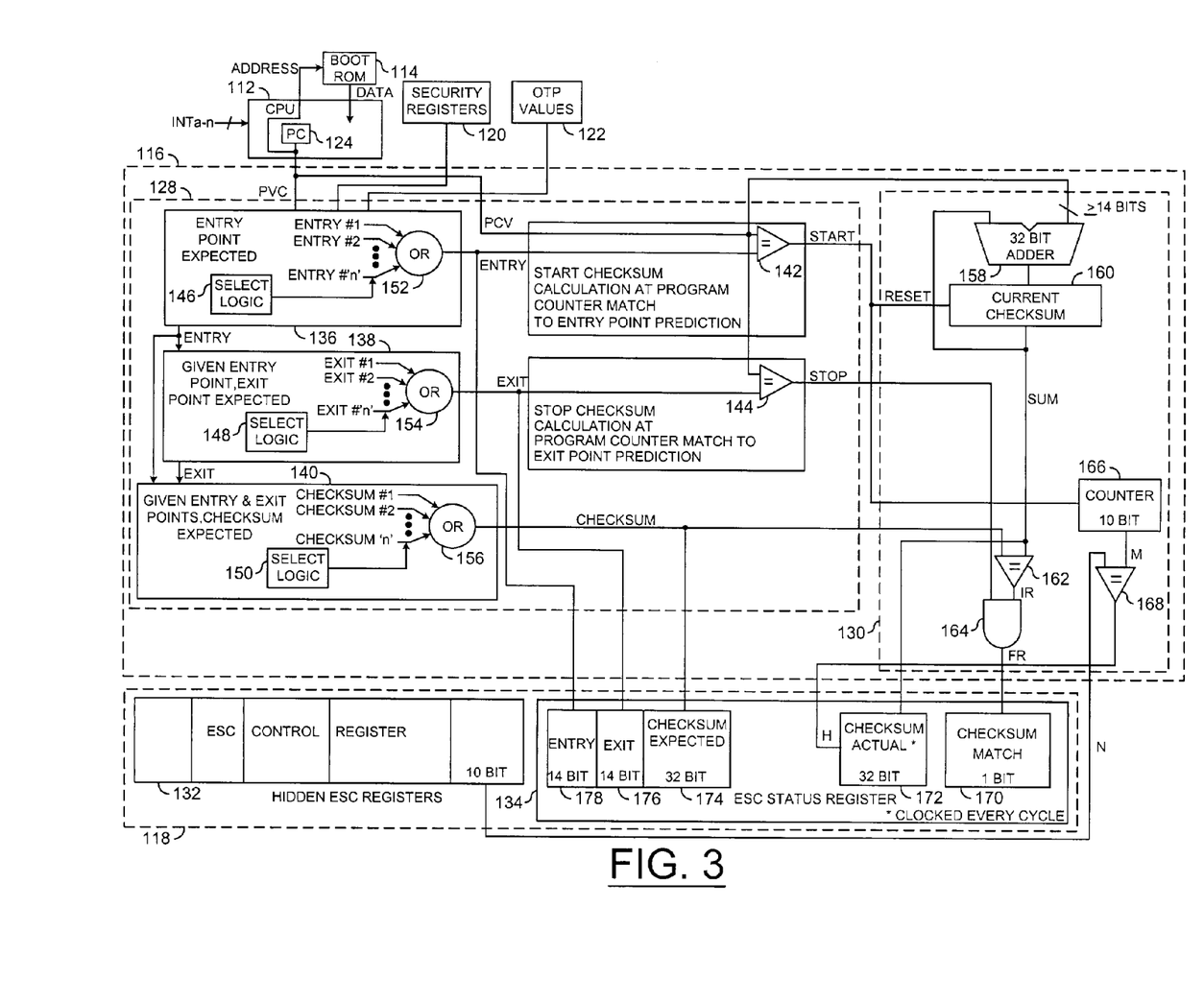
FIG. 3 is a detailed block diagram of an example implementation of a secure processor circuit.

Referring to FIG. 3, a detailed block diagram of an example implementation of the secure processor circuit 104 is shown. The checksum circuit 116 generally comprises a circuit (or function) 128 and a circuit (or function) 130. The circuit 128 may be implemented as a control circuit. The circuit 130 may be implemented as a checksum adder circuit. The hidden ESC register circuit 118 generally comprises a circuit (or function) 132 and a circuit (or function) 134. The circuit 132 may be implemented as an ESC control register circuit. The circuit 134 may be implemented as an ESC status register circuit.

The secure processor 112 may receive one or more signals (e.g., INTa-n). Each signal INTa-n may be implemented as an interrupt signal. The secure processor 112 may respond to an assertion of one, some, or all of the interrupt signal INTa-n by adjusting the program counter value accordingly. Therefore, the sequence of the program counter values may be dependent on one or more of the interrupt signals INTa-n. Other signals that affect the program counter value may be implemented to meet the design criteria of a particular application.

The control circuit 128 may receive a signal (e.g., PCV) from the secure processor 112. The signal PCV may be implemented as the program counter value or address signal. The signal PCV may represent one or more sequences of values or addresses used to address the boot ROM circuit 114. Other sequences of values generated by the secure processor 112 may be used in place of the signal PCV. Examples of the other sequences of values may include, but are not limited to instructions and/or data.

The control circuit 128 may compare the signal PCV against one or more entry points, one or more exit points, and one or more expected values. The control circuit 128 generally comprises an entry point circuit (or function) 136, an exit point circuit (or function) 138, an expected value circuit (or function) 140, a start comparison circuit (or function) 142 and a stop comparison circuit (or function 144). Each of the circuit 136, 138 and 140 may include a select logic circuit (or function) 146, 148 and 150, respectively. Each circuit 136, 138 and 140 may also contain a multiplexer function 152, 154 and 156, respectively.

Based upon values stored in the security registers 120 and/or OTP memory devices 122, the select logic circuit 146 in the entry point circuit 136 may access a particular entry point value (e.g., ENTRY) from multiple possible entry point values (e.g., ENTRY #h, where $1 \leq h \leq n$). For the particular entry point value ENTRY, the select logic circuit 148 within the exit point circuit 138, may access a particular exit point value (e.g., EXIT) from multiple possible exit point values (e.g., EXIT #j, where $1 \leq j \leq n$). For the particular entry point value ENTRY and the particular exit point value EXIT, the select logic circuit 150 within the expected value circuit 140 may access a particular expected checksum value (e.g., CHECKSUM) from among multiple checksum values (e.g., CHECKSUM #k, where $1 \leq k \leq n$).

The start comparison circuit 142 may compare the particular entry point value ENTRY with the sequence of values within the signal PCV. When the value of the signal PCV equals or matches the particular entry point value ENTRY, the start comparison circuit 142 may assert or raise a signal (e.g., START) The signal START in the asserted or raised state may initiate a checksum calculation operation within the checksum adder circuit 130.

The stop comparison circuit 144 may compare the particular exit point value EXIT with the sequence of values within the signal PCV. When the value of the signal PCV equals or matches the particular exit point value EXIT, the stop comparison circuit 144 may assert or raise a signal (e.g., STOP). The signal STOP in the asserted or raised state may stop or conclude the checksum calculation operation within the checksum adder circuit 130.

The checksum adder circuit 130 generally comprises an adder circuit (or function) 158, a register (or function) 160, an expected comparison circuit (or function) 162 and a logical gate 164. The checksum adder circuit 130 may optionally comprise a counter circuit (or function) 166 and a counter comparison circuit (or function) 168. The logical gate 164 may implement a logical AND function.

The signal PCV may be presented to the adder circuit 158. A signal (e.g., SUM) may be generated by the register circuit 160 and presented to the adder circuit 158 and the expected comparison circuit 162. The register circuit 160 may receive the signal START at a reset input. The logical AND gate 164 may receive the signal STOP. The expected comparison circuit 162 may receive the signal SUM. The expected comparison circuit 162 may also receive the expected signal CHECKSUM. The counter circuit 166 may also receive the signal START. A signal (e.g., N) generated by the ESC control register circuit 132 may be presented to the counter comparison circuit 168. A signal (e.g., M) may be generated by the counter circuit and presented to the counter comparison circuit 168.

Assertion of the signal START generally causes the register circuit 160 to reset to a default or zero value. Thereafter, the adder circuit 158 and the register circuit 160 may accumulate subsequent values of the signal PCV into the signal SUM. The signal SUM and the expected signal CHECKSUM may be compared by the expected comparison circuit 162. While values of the signals SUM and CHECKSUM are equal, the expected comparison circuit 162 may generate an intermediate result signal (e.g., IR) in a logical high or true state. While the values of the signals SUM and CHECKSUM do not match, the expected comparison circuit 162 may generate the intermediate result signal IR in a logical low or false state.

When the signal STOP may be asserted, the logical AND gate 164 may pass the intermediate result signal IR to a checksum match register 170 within the ESC status register 134 as a final checksum result signal (e.g., FR). The final checksum result signal FR may be implemented as a single bit. A logical high or true value of the final checksum result signal FR generally indicates that the secure processor circuit 104 may be sequencing properly. A logical low or false value of the final checksum result signal FR may indicate that the secure processor circuit 104 may not be sequencing properly. The final checksum result value stored in the checksum match register 170 may be presented external to the circuit 100 through the processor circuit 102.

The checksum operation may be used to validate proper design of a new circuit, proper/improper fabrication of a silicon implementation of the circuit 100 and/or verify corruption of a circuit 100 returned from a customer. A failure of the checksum operation for a circuit 100 returned from a customer may be evidence of tampering. Tampering may be caused by glitching, software attacks, fault generation, power assaults, short clock cycles, and/or similar procedures. Failure of the checksum operation may also be due to normal failures such as soft errors in the boot ROM 114 and/or security registers 120, self-healing in the OTP memory circuits 122, accidental electro-static discharge, or the like.

Given a set of values in the security registers 120 and/or the OTP memory circuits 122, the boot ROM 114, may be expected to do specific sequences for each defined interrupt to the secure processor 112. Therefore, a checksum signature having multiple expected checksum values should cover all cases except non-final sequence writes to security registers 120, which likely may be limited in number and thus tolerable. In addition, as the checksum value is calculated at each new program counter value, the current checksum value SUM may be updated to an actual checksum register 172 within the ESC status register circuit 134. The current checksum value SUM would generally provide useful information in a situation where the end point of a sequence was not achieved and internal progress information would be valued.

The ESC status register circuit 134 may contain several registers for storing data generated by the control circuit 128. The ESC status register circuit 134 generally comprises the checksum match register 170, the actual checksum register 172, an expected checksum register 174, an exit register 176, and an entry register 178. Sizing of each register 170–178 within the ESC status register circuit 134 may be implemented generally based upon the size of the program counter 124 and the addressable range of the boot ROM circuit 114.

The exit register 176 and the entry register 178 may be implemented as 14-bit registers. The exit register 176 may store the selected value for the signal EXIT. The entry register 178 may store the selected value for the signal ENTRY. The expected checksum register 174 and the actual checksum register 172 may be implemented as 32-bit registers. The expected checksum register 174 may store the selected value for the expected signal CHECKSUM.

In some debug situations, a benefit may be realized to analyze the checksum value in the signal SUM before the signal STOP may be asserted and the window of operation completes. To record an intermediate checksum value at a predetermined number of steps into the window of operation, a value for the predetermined number may be written into the ESC control register circuit 132, usually by the processor circuit 102. The predetermined number may be conveyed from the ESC control register circuit 132 to the counter comparison circuit 168 via the signal N.

Upon assertion of the signal START, the counter circuit 166 may reset and begin counting steps taken by the program counter value PCV. Each step may increment the count signal M generated by the counter circuit 166. When the count signal M equals the predetermined number of counts in the signal N, the counter comparison circuit 168 may assert a hold signal (e.g., H) in a logical high or true state. The actual checksum register 172 may respond to the hold signal H in the true state by storing and holding the current checksum value in the signal SUM. Therefore, the intermediate checksum value may be available external to the circuit 100 via the processor circuit 102 for examination.

Figure 4:
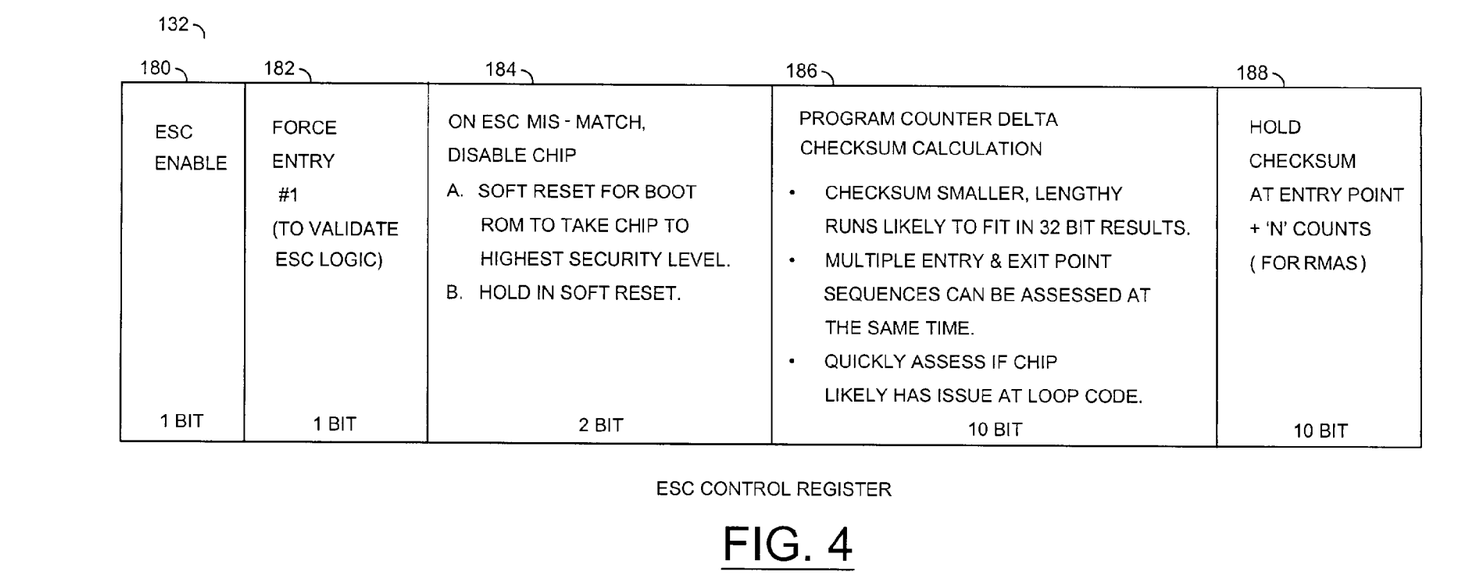
FIG. 4 is a block diagram of an example implementation of an embedded sequence checking control register circuit.

Referring to FIG. 4, a block diagram of an example implementation of the ESC control register circuit 132 is shown. The ESC control register circuit 132 generally comprises an enable register 180, a force entry register 182, a mismatch disable register 184, a program counter delta register 186, and a hold checksum register 188. The enable register 180 and the force entry register 182 may each be implemented as single-bit registers. The mismatch disable register 184 may be implemented as a two-bit register. The program counter delta and hold checksum registers 186 and 188 may each be implemented as ten-bit registers.

The enable register 180 may store a true state or a false state. While the enable register 180 stores the true state, the embedded sequence checking functionality of the secure processor circuit 104 may be enabled. While the enable register 180 store the false state, the embedded sequence checking functionality may be disabled.

The force entry register 182 may store a true state or a false state. While the force entry register 182 stores the true state, access to certain registers and memory devices may be enabled. For example, during a forced entry, the values in the security register circuits 120 and OTP memory circuits 122 may be written, and all data from the ESC status register circuit 134 may be read. While the force entry register 182 stores the false state, access may be limited to reading the checksum match register 170.

The mismatch disable register 184 may store two bits of information for what action to take upon detection of a mismatch between the signal CHECKSUM and the final checksum value in the signal SUM upon assertion of the signal STOP. A first bit may cause a soft reset from the boot ROM circuit 114 and take the secure processor circuit 104 to a highest security level upon detection of the mismatch. A second bit may cause the secure processor circuit 104 to hold in the soft reset effectively disabling the secure processor circuit 104. Other methods of configuring the secure processor circuit 104 upon a mismatch detection may include, but are not limited to disabling one or more functions or operations, and executing an infinite loop in the secure processor 112.

The program counter delta register 186 may store multiple bits defining a number of steps of the program counter value to accumulate a next checksum value. Using a step delta of greater than unity may be helpful in assessing multiple entry and exit point sequences simultaneously. The program counter delta value may also be useful in determining if the circuit 100 likely has an issue at a loop code.

The hold checksum register 188 may store multiple bits defining a number of steps past the assertion of the signal START to capture and hold the intermediate checksum value in the actual checksum register 172. The hold checksum register 188 may generate the signal N to the counter comparison circuit 168. The hold checksum register value may be useful in assessing evidence of tampering for chips returned from customers.

Determination of the entry point values, exit point values, and/or expected values may be performed manually and/or automatically. A silicon validation tool executing a model of the circuit 100 may be used to build the expected values from a given sequence of the program counter values and values stored in the OTP memory circuits 122 and the security register circuits 120 on a cycle basis. A comprehensive checksum signature index may then be built for an expected results inventory.

Figure 5:
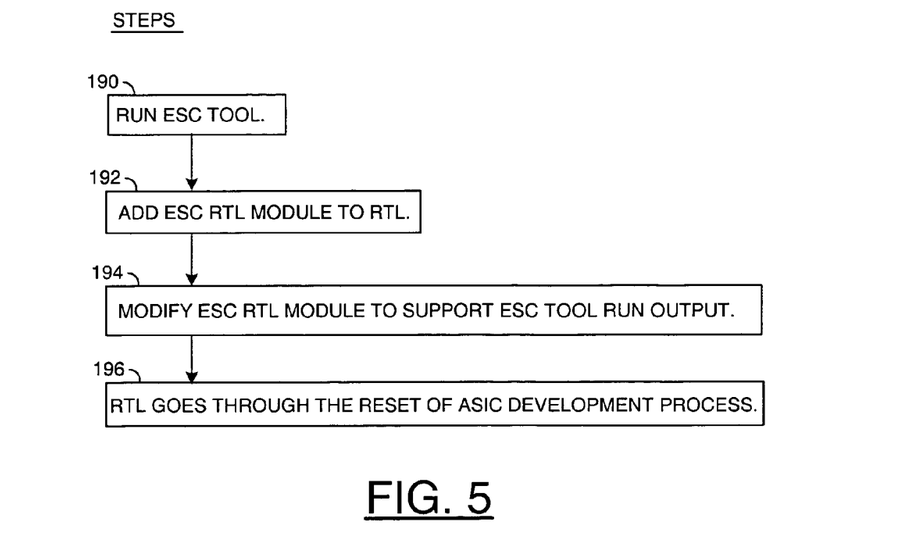
FIG. 5 is a flow diagram of an example process to implement an embedded sequence checking capability into an application specific integrated circuit.

Referring to FIG. 5, a flow diagram of an example process to implement an embedded sequence checking (ESC) capability into an application specific integrated circuit (ASIC) is shown. An ESC tool may be run to develop the entry and exit points and the expected checksums for each combination (e.g., block 190). The entry points, exit points, and checksum values may be used to edit an ESC register transfer language (RTL) code module for the ASIC to support a specific version of code to be stored in a boot ROM (e.g., block 192). The ASIC module may also be generated in a hardware description language, C programming code, or other suitable language. The ESC RTL module may be modified to support an ESC tool run output (e.g., block 194). The RTL model may then go through the remainder of a normal ASIC development process (e.g., block 196).

Since the code stored in the boot ROM may be defined in one or more fabrication masks, such as diffusion mask and/or metal mask, hard-coding the entry and exit points and the expected checksums may be an acceptable approach, as opposed to having the values in hidden registers, for example. For each revision of the boot ROM code, the mask set for the ASIC may be re-done at that time and the hard-coding mentioned may be implemented as part of the boot ROM revisions. Placing the entry points, the exit points and the checksum values in the boot ROM generally requires basic boot ROM functionality that may not exist at times. Placing the entry points, the exit points and the checksum values in some other nonvolatile memory may require a load from nonvolatile memory, which may not be available if access to the nonvolatile may be disabled or flash authentication has not been achieved. For example, on a current version of boot ROM code, there may be seven entry points and two exit points for a total of fourteen paths through the code to calculate checksum values.

Figure 6:
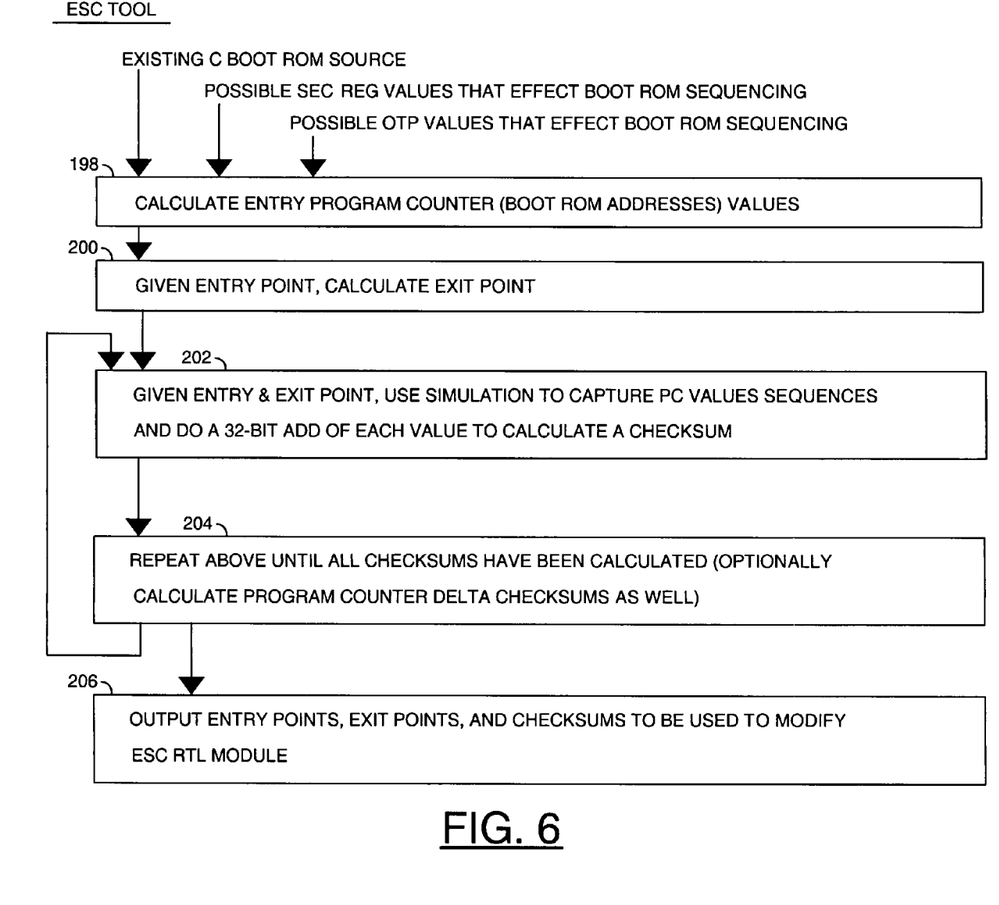
FIG. 6 is a flow diagram of an example method of operation for an embedded sequence checking tool.

Referring to FIG. 6, a flow diagram of an example method of operation for the ESC tool is shown. The operation may include calculating entry points for the program counter values (e.g., block 198). Exit points may then be calculated based upon the entry points (e.g., block 200). A simulation of the circuit may then be used to capture program counter value sequences for the given entry points and exit points to determine various checksum values (e.g., block 202). Calculation of the checksum values may be repeated until all checksum values have been calculated (e.g., block 204). The output entry points, exit points and checksum values may be used to modify the ESC RTL module (e.g., block 206).

It may be possible that two or more checksums generate the same values during development of the boot ROM code. In such a situation, the boot ROM code may be adjusted to cause the identical checksum values to become unique checksum values. The adjustments may involve moving portions of the boot ROM code to different addresses and/or adding non-operational instructions into the boot ROM code to create changes in the expected checksum values.

The boot ROM code may contain instructions that may change values stored within the security registers 120. Since the security registers 120 may be used to determined a proper exit value, the design of the embedded sequence checking may account for writes that impact the exit values. For example, the exit values may be implemented to assert the signal STOP and end the checksum operation prior to a write to the security registers 120 that would alter the current exit value. In another example, the write to the security registers 120 may be accounted for in programming the exit values such that the proper exit value may be reached because of the change in the register values within the security registers 120.

The examples shown in FIGS. 3–6 and the related concepts may be independent of the code used, the CPU or processors used, whether there are other registers (like security registers) or other memory (like OTP) or not, and/or whether the circuit 100 may be designed for a set-top chip or a smartcard chip or any other embedded CPU in a system.

Further, the embedded sequence checking technology may be used on state machines or other process controls that may have a fixed sequence to assess.

Figure 7:
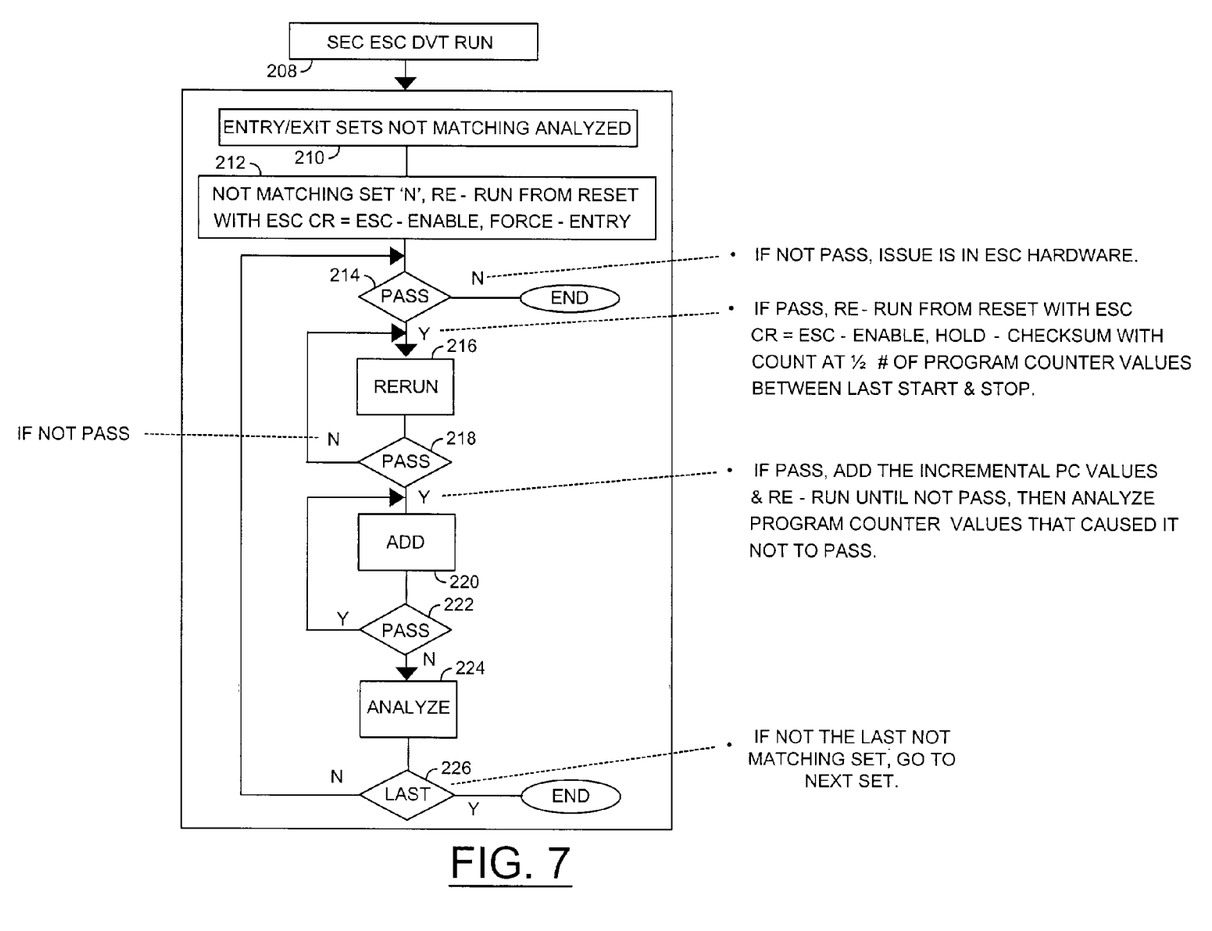
FIG. 7 is a flow diagram of an example process for assessing a circuit returned by a customer.

Referring to FIG. 7, a flow diagram of an example process for assessing a circuit returned by a customer is shown. The returned circuit may have the security design validation tests (DVTS) run to see which tests do not pass (e.g., block 208). The DVTs that do not pass may be sequenced up to less than a completion point for comparison with a new expected value until an initial not-passing point may be located. To find the initial not-passing point, the entry and exit points may be analyzed to provide an initial isolation of where the sequence diverted from the expected checksum (e.g., block 210). A non-matching set of entry/exit points may be rerun from a reset with force entry enabled (e.g., block 212). If the DVT test still fails (e.g., the N branch of decision block 214), an issue may exist in the ESC functionality and the testing ended.

If the DVT test passes (e.g., the Y branch of decision block 214), the test may be rerun with the value N set to approximately one-half of the program counter values between the last starting and stopping points (e.g., block 216). If the rerun DVT test still fails (e.g., the N branch of decision block 218), the test may be rerun again with the value N reset to approximately half way between the last starting and stopping points (e.g., block 216). The loop may continue with approximately one-quarter, one-eighth, and smaller steps into the window until the test passes.

Once the DVT test passes (e.g., the Y branch of decision block 218), the program counter value may be incremented from the last stopping point and the tests rerun until a failure occurs (e.g., block 220 and 222). Once the failure has been isolated to a particular step of the program counter (e.g., the N branch of decision block 222), an analysis of the failed step may be performed to determined a cause of the failure (e.g., block 224). If additional failures remain (e.g., the N branch of decision block N), additional DVT tests may be performed. If the last failure has been isolated (e.g., the Y branch of decision block 226), the testing may be concluded.

The embedded sequence checking capability may be upgraded to support an ESC built-in self test (BIST). The ESC BIST may be implemented by the embedded state machine 127. The state machine 127 may be configured to sequence through the start and stop sequence points, compare actual with expected values, log results and iterate through the steps until conclusion of the self-test. The ESC BIST may be capable of detect glitching and therefore, upon a detection may enable and/or disable functions that could diminish operation of the circuit 100 and/or secure processor circuit 104 such that the tampering may be unsuccessful.

Figure 8:
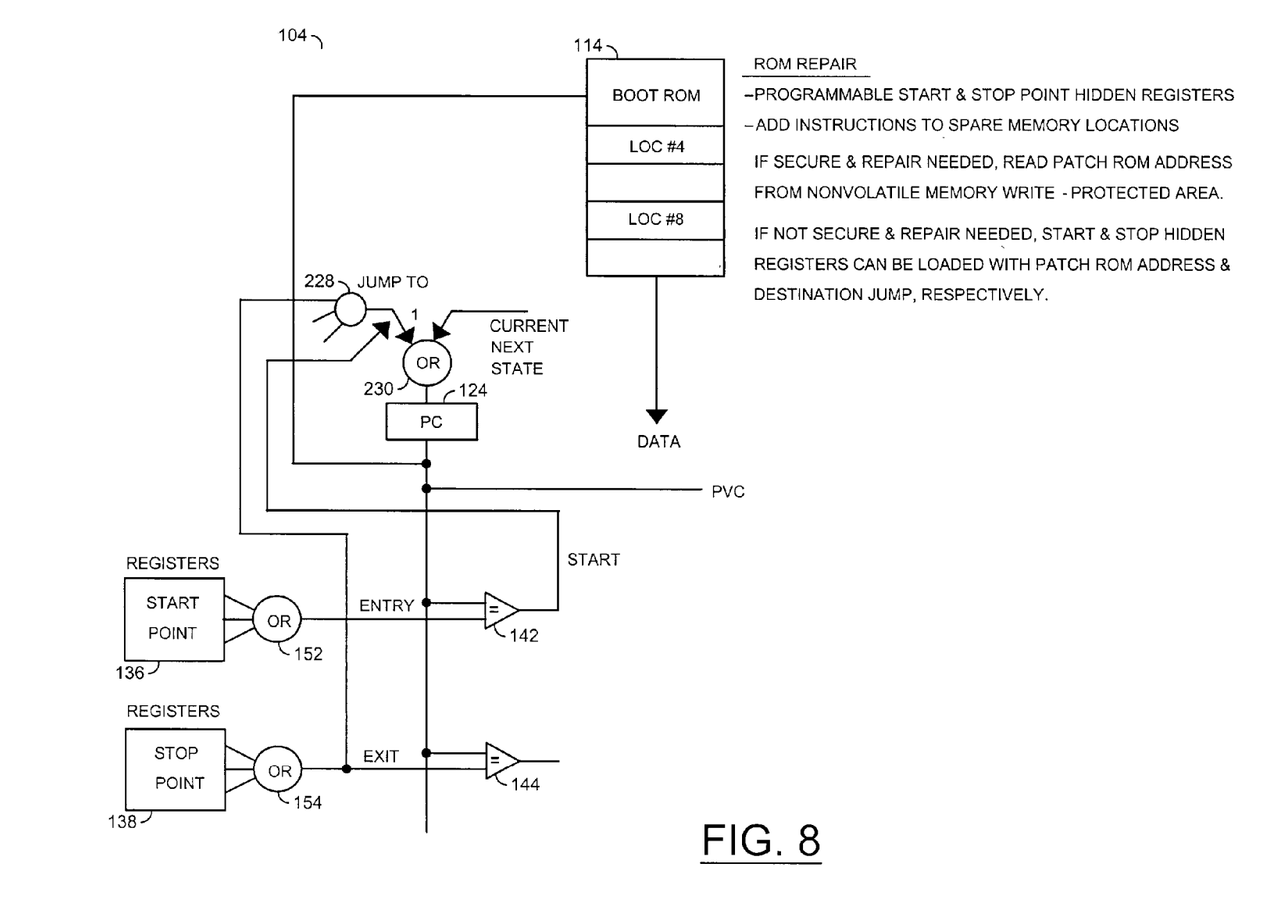
FIG. 8 is a partial block diagram of a second example implementation of a secure processor circuit.

Referring to FIG. 8, a partial block diagram of a second example implementation of the secure processor circuit 104 is shown. The embedded sequence checking capability may provide support for ROM code repair. ROM code repair circuitry generally comprises a multiplexer circuit 228 and another multiplex circuit 230. The multiplexer 228 and 230 may be configured to enable a dual function on the entry points, where the second function may be a program counter value match on when to do a jump in the boot ROM code. The multiplexers 228 and 230 may also be configured to enable a dual function on the exit points, where the second function may be a program counter value match on where to jump to.

In non-repair operation, the multiplexer 230 may provide a current next state signal (e.g., CNS) to the program counter 124. The program counter 124 may update the signal PCV to match the signal CNS at each step. The updated signal PCV may then be used to address the boot ROM 114 to access data.

To repair a damaged portion of the boot ROM code, a start or entry point may be programmed into the entry point circuit 136. When the start comparison circuit 142 indicate a match between the signal PCV and the signal ENTRY, the multiplexer 230 may address a next state for the program counter 124 from the multiplexer 228. The multiplexer 228 may address the signal EXIT as the next state for the program counter 124. Therefore, on the next step of the program counter value, the value programmed into the signal EXIT may be used to address the boot ROM 114 in place of the value in the signal CNS.

Figure 9:
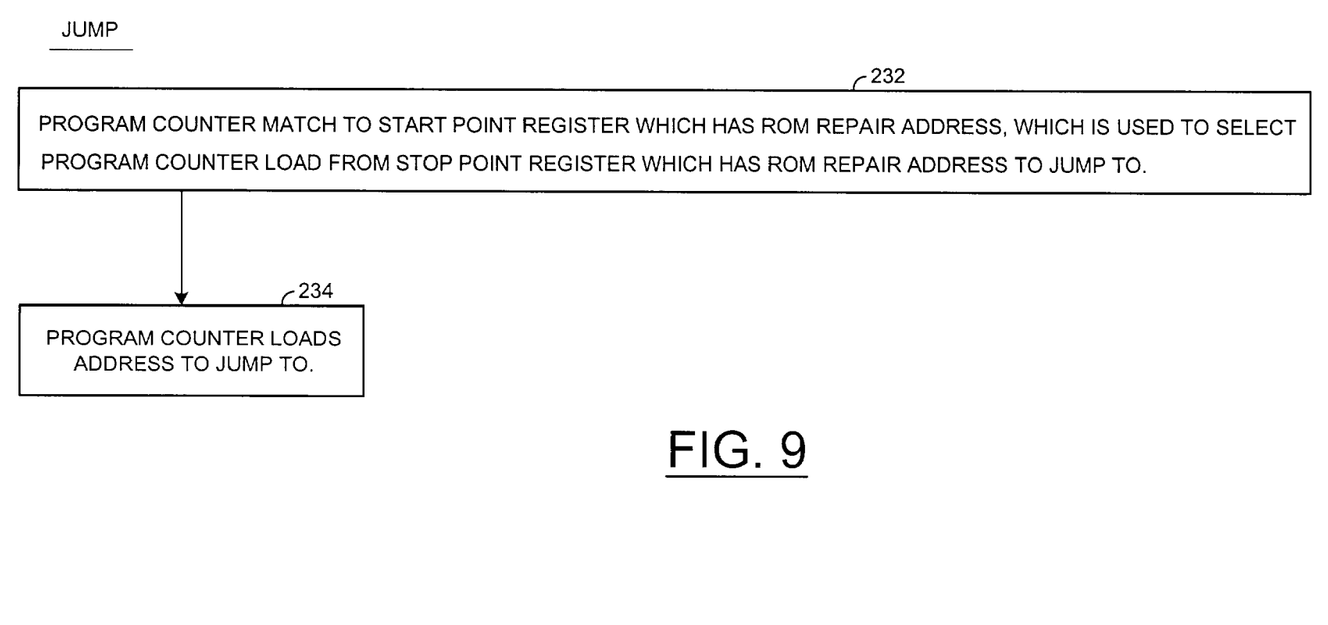
FIG. 9 is a flow diagram of an example method of operation for a boot ROM code repair.

Referring to FIG. 9, a flow diagram of an example method of operation for a boot ROM code repair is shown. The program counter value may match a repair address in the starting point register (e.g., block 232). The multiplexer 228 may concurrently route a new address associated with the repair address from the stopping point register to the multiplexer 230 (e.g., block 232). Upon detection of the match between the repair address and the program counter value PCV, the multiplexer 230 may route the new address from the stopping point register to the program counter 124 for loading (e.g., block 230). Loading of the new address into the program counter 124 may address a redundant section of code in the boot ROM 114. For example, the code in a location #8 of the boot ROM 114 may be redundant to the code in a location #4 of the boot ROM 114.

Figure 10:
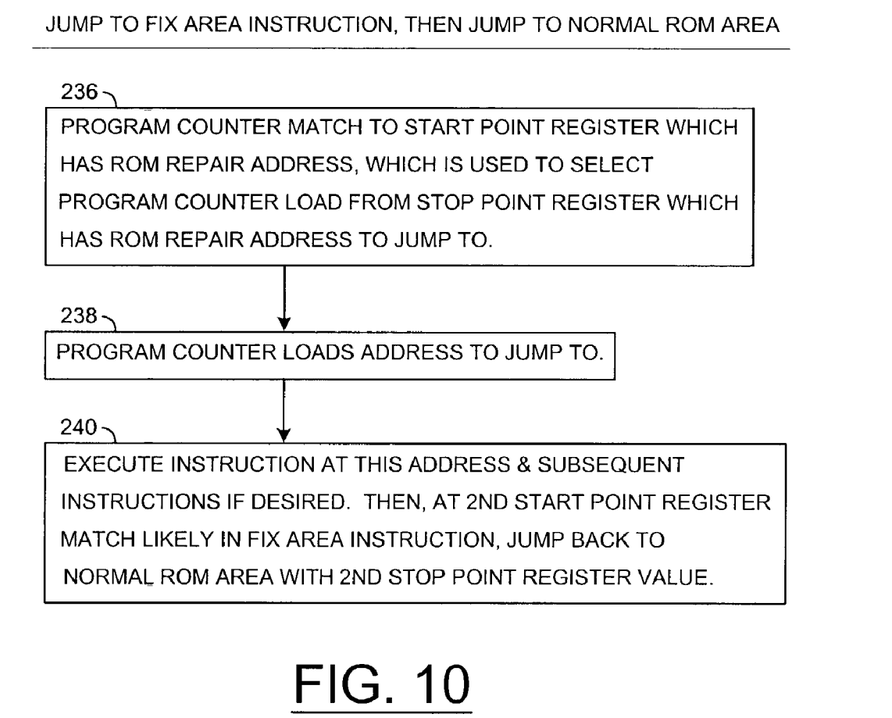
FIG. 10 is a flow diagram of a second example method of operation for a boot ROM code repair.

Referring to FIG. 10, a flow diagram of a second example method of operation for a boot ROM code repair is shown. A match between the program counter value PCV to a repair address in the starting point register may cause a new address to be provided to the program counter 124 from the stopping point register (e.g., block 236). The program counter 124 may load the new address at a next step causing a jump to redundant code in the boot ROM 114 (e.g., block 238). The redundant code may be executed from the boot ROM 114 until a second repair address matches the program counter value (e.g., block 240). Concurrently, the stopping point register may provide a second new address to the multiplexer 228 (e.g., block 240). Upon detection of the match between the program counter value PCV and the second repair address, the program counter 124 may receive the second new address from the multiplexers 228 and 230. The next step of the program counter 124 may use the second new address for the program counter value PCV causing the boot ROM addressing to jump back to a normal ROM area containing the original code (e.g., block 240). Jumping between the original code and the redundant code may be performed multiple times during a thread of operation by appropriate programming of the starting and stopping point registers.

The embedded sequence checking technology may enable detailed silicon validation of embedded CPUs without using a debugger while increasing security to internal operations and data. The embedded sequence checking may be code independent and/or CPU type independent. An ability to detect out-of-sequence orders of a program counter, instructions, or similar sequential items may provide a tamper-resistive method for glitching, as well as microprobing, eavesdropping, fault generation, key tampering for banking, authentication, and/or digital signatures.

The embedded sequence checking functionality may provide a basis for ROM code repair. An embedded CPU with embedded, non-re-writable instruction storage, may use the embedded sequence checking with an upgrade to generate a new revision of the code without changing ROM. Sequencing through the ROM may then be changed without having to do a revision of the chip.

The function performed by the flow diagrams of FIGS. 5–7 and 9–10 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAS, or by interconnecting an appropriate network of conventional component circuits, as is described herein, modifications of which will be readily apparent to those skilled in the art(s). The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A circuit comprising:
a control function configured to assert (i) a start signal in response to a first value of a predetermined sequence of values in a program signal matching a particular entry value and (ii) a stop signal in response to a second value of said predetermined sequence of values in said program signal matching a particular exit value; and
a checksum function configured to (i) generate a checksum value from said predetermined sequence of values in said program signal between assertions of said start signal and said stop signal and (ii) generate a result value in response to comparing said checksum value with a particular expected value.

2. The circuit according to claim 1, further comprising a first processor having a program counter function configured to generate said program signal.

3. The circuit according to claim 2, wherein said program signal is generated in response to an interrupt signal received by said first processor.

4. The circuit according to claim 2, further comprising a second processor configured to generate an output signal carrying said result value external to said circuit.

5. The circuit according to claim 4, wherein said second processor is further configured to access said result value from a register in response to a unique combination of at least two items selected from an address item, a data item, a register index item, and a last access criteria item.

6. The circuit according to claim 1, wherein said sequence of values comprises a sequence of instructions executable within said circuit.

7. The circuit according to claim 1, further comprising a state machine function configured to sequence both said control function and said checksum function through a plurality of entry values and a plurality of exit values as part of a self-test.

8. The circuit according to claim 1, further comprising a one-time programmable memory function configured to store a programmed value, wherein said control function is further configured to determine said particular expected value in response to said programmed value.

9. The circuit according to claim 1, further comprising a register (i) unreadable from external to said circuit and (ii) configured to store a count value, wherein said control function is further configured to store said checksum value in response to said program signal stepping said count value from said first value.

10. The circuit according to claim 1, further comprising a register unreadable from external to said circuit, wherein said stop signal is asserted prior to said program signal addressing an instruction causing at least one entry in said register to change.

11. The circuit according to claim 1, further comprising a self-test function configured to sequence said circuit to generate a plurality of said result values.

12. The circuit according to claim 1, further comprising an interface in communication with at least one of said control function and said checksum function to exchange information external to said circuit.

13. The circuit according to claim 1, further comprising a memory configured to store selection information, wherein said control function comprises a first select logic configured to select said particular entry value among a plurality of entry values based on said selection information.

14. The circuit according to claim 13, wherein said control function further comprises a second select logic configured to select said particular exit value among a plurality of exit values based on said selection information.

15. The circuit according to claim 14, wherein said control function further comprises a third select logic configured to select said particular expected value among a plurality of expected values based on said selection information.

16. The circuit according to claim 15, further comprising a plurality of test pads coupleable to said memory to read said selection information.

17. A method of operating a circuit, comprising the steps of:
   (A) generating a program signal having a sequence of values, wherein each individual value of said sequence of values comprises multiple bits;
   (B) generating a checksum value by summing said individual values at a plurality of cycles during a window of operation; and
   (C) generating a result value by comparing said checksum value with an expected value defined within said circuit upon conclusion of said window of operation.

18. The method according to claim 17, further comprising the step of:
   beginning said window of operation in response a first value of said sequence of values in said signal matching an entry value.

19. The method according to claim 18, further comprising the step of:
   ending said window of operation in response to a second value of said sequence of values in said program signal matching an exit value.

20. The method according to claim 19, further comprising the step of:
   replacing a next value in said program signal with said exit value in response to a current value of said sequence of values in said program signal matching said entry value.

21. The method according to claim 17, further comprising the step of:
   storing said checksum value at each of said cycles during said window of operation.

22. The method according to claim 21, further comprising the step of:
   storing said checksum value at least two predetermined number of cycles into said window of operation to isolate a particular cycle of said cycles where said checksum value fails comparison with said expected value.

23. The method according to claim 22, wherein a first of said at least two predetermined number of cycles is approximately one-half a total number of cycles through said window of operation.

24. The method according to claim 23, wherein a second of said at least two predetermined number of cycles is approximately one-fourth said total number of cycles.

25. The method according to claim 23, wherein a second of said at least two predetermined number of cycles is an increment from said first predetermined number of cycles.

26. The method according to claim 17, further comprising the step of:
   saving said checksum value calculated a predetermined number of said cycles into said window of operation.

27. The method according to claim 17, further comprising the step of:
   configuring said circuit into a tamper resistant configuration in response to said result value indicating that said checksum value is different than said expected value.

28. The method according to claim 27, wherein the step of configuring comprises the sub-step of:
   disabling at least one function of said circuit.

29. The method according to claim 27, wherein the step of configuring comprises the sub-step of:
   resetting said circuit to a predetermined security level.

30. The method according to claim 27, wherein the step of configuring comprises the sub-step of:
   holding said circuit in a reset mode.

31. The method according to claim 17, comprising a storage medium for use in a computer, said storage medium for recording a computer program comprising the steps of claim 17.

32. A circuit comprising:
   means for generating a program signal having a sequence of values, wherein each individual value of said sequence of value comprises multiple bits;
   means for generating a checksum value by summing said individual values at a plurality of cycles during a window of operation; and
   means for generating a result value by comparing said checksum value with an expected value defined within said circuit upon conclusion of said window of operation.

33. A circuit comprising:
   a control function configured to assert (i) a start signal in response to a signal having a predetermined sequence of values matching an entry value and (ii) a stop signal in response to said signal matching an exit value;
   a checksum function configured to (i) generate a checksum value for said signal between assertions of said start signal and said stop signal and (ii) generate a result signal in response to comparing said checksum value with an expected value; and a register function (i) unreadable from external to said circuit and (ii) configured to provide a register value to said control function, wherein said control function is further configured to determine said expected value in response to said register value.

34. A method for embedded sequence checking, comprising the steps of:
  (A) asserting a start signal in response to a first value of a predetermined sequence of values in a program signal matching a particular entry value;
  (B) asserting a stop signal in response to a second value of said predetermined sequence of values in said program signal matching a particular exit value;
  (C) generating a checksum value from said predetermined sequence of values in said program signal between assertions of said start signal and said stop signal; and
  (D) generating a result value in response to comparing said checksum value with a particular expected value.

* * * * *